US007618170B2

(12) United States Patent
Sugiyama et al.

(10) Patent No.: US 7,618,170 B2
(45) Date of Patent: Nov. 17, 2009

(54) INFRARED LIGHT IRRADIATING LAMP FOR VEHICLE

(75) Inventors: Yuji Sugiyama, Shizuoka (JP); Shigeyuki Watanabe, Shizuoka (JP); Shoichiro Yokoi, Shizuoka (JP); Atsushi Sugimoto, Shizuoka (JP); Hideki Fukuchi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 11/890,568

(22) Filed: Aug. 7, 2007

(65) Prior Publication Data

US 2008/0037269 A1 Feb. 14, 2008

(30) Foreign Application Priority Data

Aug. 9, 2006 (JP) ............................ 2006-217483

(51) Int. Cl.
*F21V 11/00* (2006.01)
*B60Q 1/00* (2006.01)
*F21V 9/00* (2006.01)

(52) U.S. Cl. ........................ 362/510; 362/539; 362/293

(58) Field of Classification Search ................. 362/510, 362/539, 293

See application file for complete search history.

(56) References Cited

U.S. PATENT DOCUMENTS 6,015,220 A * 1/2000 Blusseau .................... 362/303
6,467,940 B2 * 10/2002 Eschler et al. .............. 362/510
6,897,459 B2 * 5/2005 Albou .................... 250/504 R
6,976,772 B2 * 12/2005 Albou et al. ................ 362/510
7,316,492 B2 1/2008 Yamamura et al.
2003/0007363 A1 * 1/2003 Yagi ........................... 362/510
2003/0076688 A1 4/2003 Kobayashi
2003/0202358 A1 * 10/2003 Albou et al. ................ 362/510
2004/0136200 A1 * 7/2004 Bos et al. .................... 362/512

(Continued)

FOREIGN PATENT DOCUMENTS

CN 1676989 A 10/2005

(Continued)

OTHER PUBLICATIONS

Patent Abstracts of Japan, Publication No. 2004-087281, Publication Date: Mar. 18, 2004, 2 pages.

(Continued)

*Primary Examiner*—Hargobind S Sawhney
*Assistant Examiner*—David J Makiya
(74) *Attorney, Agent, or Firm*—Osha • Liang LLP

(57) ABSTRACT

An infrared light irradiating lamp for a vehicle includes a projection lens disposed on an optical axis extending in a longitudinal direction of the vehicle, a light source bulb disposed behind a rear focal point of the projection lens, a reflector for reflecting light emitted from the light source bulb in a forward direction close to the optical axis by setting the light source bulb as a first focal point of the reflector, a filter driving unit disposed between the projection lens and the light source bulb, the filter driving unit having a movable shaft to be driven in a vertical direction, a bracket having a tip portion and a base end, the tip portion holding an infrared light transmitting filter, and a rotating shaft disposed between the movable shaft to the base end of the bracket for linking the movable shaft to the base end.

7 Claims, 7 Drawing Sheets

U.S. PATENT DOCUMENTS

| | | | | |
|---|---|---|---|---|
| 2004/0240221 | A1 * | 12/2004 | Choi | 362/510 |
| 2006/0002128 | A1 * | 1/2006 | Suzuki et al. | 362/509 |

FOREIGN PATENT DOCUMENTS

| | | |
|---|---|---|
| JP | 2004-71443 | 3/2004 |
| JP | 2004-87281 | 3/2004 |

OTHER PUBLICATIONS

Patent Abstracts of Japan, Publication No. 2004-071443, Publication Date: Mar. 4, 2004, 2 pages.

Chinese Notification of Opinions of First Examination for patent application No. 200710140170.X, dated Jul. 25, 2008, and English translation thereof, 10 pages.

German Office Action for Application No. 10 2007 037 308.4-54, mailed on May 13, 2009 (8 pages).

* cited by examiner

INFRARED LIGHT IRRADIATING LAMP FOR VEHICLE

This application claims foreign priority from Japanese Patent Application No. 2006-217483 filed on Aug. 9, 2006, the entire contents of which are hereby incorporated by reference.

BACKGROUND OF THE INVENTION

1. Field of the Invention

The present invention relates to an infrared light irradiating lamp for a vehicle which can irradiate a light of a light source bulb having a filament as an infrared light by using a reflector, an infrared light transmitting filter and a projection lens.

2. Background Art

There is an infrared light irradiating lamp for a vehicle which is loaded onto a car and illuminates a forward part of a vehicle with an infrared light, and can process a photographed image to confirm an obstacle together with a CCD camera having a near-infrared sensitivity or less (for example, see Patent Document 1).

As shown in FIG. 8, an infrared light irradiating lamp 1 for a vehicle of this type has such a structure that a light source bulb 9 to be a visible light source and a reflector 11 taking an almost elliptical spherical shape are disposed in a lighting chamber 7 formed by a lamp body 3 and a front lens 5, and an infrared light transmitting filter 13 in which an infrared light transmitting film for reflecting a visible light component and transmitting an infrared light component is formed in a whole surface region of a glass plate is provided between the light source bulb 9 and the front lens 5 in order to close a whole front opening portion of the lighting chamber 7.

In general, the light source bulb 9 is attached in a so-called rear inserting structure in which it is inserted from a rear part of the reflector 11 along an optical axis Ax of a lamp emitting light and is constituted in such a manner that a whole light emitted from a light source toward the front lens 5 passes through the infrared light transmitting film. A visible light component of the light of the light source which is reflected by the reflector 11 is cut when the light passes through the infrared light transmitting film, and the light is mainly changed into a light having only an invisible infrared light component and is emitted and distributed forward from the front lens 5.

An infrared light irradiating region in the forward part of the vehicle is photographed by means of a CCD camera having a near-infrared sensitivity or less which is provided in the front part of the car and is processed by an image processing device, and is displayed on a monitor screen in a vehicle compartment. A driver can confirm a person, a lane mark and an obstacle in a distant place over the monitor screen for displaying a field of view in the forward part of the vehicle.

However, a conventional infrared light irradiating lamp for a vehicle is provided with an additional light source for an infrared light. For this reason, the number of components is increased and a man-hour for attaching the light source for an infrared light is also increased so that a cost is increased. Therefore, there has been proposed an infrared light irradiating lamp for a vehicle which can utilize an existing headlamp as the light source for an infrared light (for example, see Patent Document 2).

As shown in FIG. 9, the infrared light irradiating lamp for a vehicle comprises a halogen lamp 15 for emitting a light at least from a visible region to an infrared region, and a filter 17 for transmitting an infrared light in the lights emitted from the halogen lamp 15 and shielding a visible light. The halogen lamp 15 and the filter 17 are accommodated in one lamp unit and the filter 17 provided to be rotatable in an A direction around a pin 19 is rotated in the A direction so that the infrared light or a high beam is switched and emitted.

[Patent Document 1] JP-A-2004-87281 Publication

[Patent Document 2] JP-A-2004-71443 Publication

SUMMARY OF THE INVENTION

In a conventional infrared light irradiating lamp for a vehicle, an infrared light transmitting filter is provided in the vicinity of a rear part of a projection lens. Thus, an external light transmitted through the projection lens is reflected by the infrared light transmitting filter taking a shape of a mirror surface having a high reflectance, and is changed into a glare on an outside of the projection lens and is visually observed.

By disposing the infrared light transmitting filter apart from the projection lens in a rearward direction, glare can be reduced. However, a large space is required as a movable space of the infrared light transmitting filter. Thus, an overall length of the lamp is increased.

One or more embodiments of the present invention provide an infrared light irradiating lamp for a vehicle of a visible light and infrared light switching type in which an infrared light transmitting filter can be disposed apart from a projection lens greatly in a rearward direction, thereby preventing a glare without increasing an overall length of a lamp body.

In one or more embodiments, an infrared light irradiating lamp for a vehicle comprises a projection lens disposed on an optical axis extending in a longitudinal direction of the vehicle; a light source bulb disposed behind a rear focal point of the projection lens such that a longitudinal direction of a filament is substantially orthogonal to the optical axis; a reflector for reflecting a light emitted from the light source bulb in a forward direction close to the optical axis by setting the light source bulb as a first focal point of the reflector; a filter driving unit disposed between the projection lens and the light source bulb, the filter driving unit comprising a movable shaft to be driven in a vertical direction; a bracket comprising a tip portion and a base end, where the tip portion holds an infrared light transmitting filter; and a rotating shaft linking the movable shaft to the base end, and wherein a distance from the rotating shaft to the base end is less than a distance from the rotating shaft to the tip portion, wherein the infrared light transmitting filter is movable between a transmitting position in which a light reflected by the reflector is intercepted and a retreating position in which the reflected light is not intercepted between the light source bulb and a second focal point of the reflector.

In an infrared light irradiating lamp for a vehicle in accordance with one or more embodiments of the present invention, the light source bulb is transversely inserted in such a manner that the longitudinal direction of the filament is almost orthogonal to the direction of the optical axis. As compared with a longitudinal insertion along the optical axis, it is possible to maintain a larger space between the second focal point and the light source bulb. Therefore, the space can be utilized as a movable space for the infrared light transmitting filter.

In one or more embodiments of the present invention, the filter driving unit having the movable shaft to be vertically driven is provided between the light source bulb and the projection lens, and the movable shaft rotates the infrared light transmitting filter through the bracket. Therefore, the filter driving unit greatly moves the infrared light transmitting filter in a small joining portion housing space by utilizing the principles of a lever and can thus displace the infrared light transmitting filter to the transmitting position and the retreating position.

In one or more embodiments of the present invention, the infrared light irradiating lamp for a vehicle further comprises a shade provided with an opening portion for causing a part of the light reflected by the reflector to pass therethrough, and the infrared light transmitting filter is displaced in order to intercept the reflected light passing through the opening portion between the shade and the light source bulb.

In an infrared light irradiating lamp for a vehicle in accordance with one or more embodiments or the present invention, the infrared light transmitting filter is displaced on the light source bulb side of the shade. Therefore, the infrared light transmitting filter and the vicinal members are covered with the shade and the external appearances of the infrared light transmitting filter and the bracket cannot be seen from the outside of the lamp (the outside of the projection lens). Consequently, the appearance can be enhanced.

In one or more embodiments of the present invention, a clearance for introducing a part of the light reflected by the reflector and a direct light emitted from the light source bulb and reflecting the same light by the shade, and reflecting the reflected light by the infrared light transmitting filter or the bracket and irradiating the reflected light on the projection lens is formed between the shade and the bracket.

In an infrared light irradiating lamp for a vehicle in accordance with one or more embodiments of the present invention, the infrared light transmitting filter is disposed in the opening portion of the shade. Consequently, the light emitted from the light source bulb is transmitted through the infrared light transmitting filter and is emitted as a reddish infrared light. By mixing, with the infrared light, a white light coming through the light source bulb which is not transmitted through the infrared light transmitting filter but passes through the clearance, it is possible to reduce the visual observation of the reddish projection lens in the irradiation of the infrared light.

In an infrared light irradiating lamp for a vehicle in accordance with one or more embodiments of the present invention, the light source bulb is transversely inserted in such a manner that the longitudinal direction of the filament is almost orthogonal to the direction of the optical axis. As compared with a longitudinal insertion along the optical axis, therefore, it is possible to maintain a larger space between the second focal point and the light source bulb. Therefore, the space can be utilized as a movable space for the infrared light transmitting filter.

In one or more embodiments of the present invention, the filter driving unit having the movable shaft to be vertically driven is provided between the light source bulb and the projection lens, and the movable shaft rotates the infrared light transmitting filter through the bracket. Therefore, the filter driving unit greatly moves the infrared light transmitting filter in a small joining portion housing space by utilizing the principles of a lever and can thus displace the infrared light transmitting filter to the transmitting position and the retreating position.

As compared with the conventional infrared light irradiating lamp, accordingly, it is possible to dispose the infrared light transmitting filter apart from the projection lens more greatly in the rearward direction and to prevent a glare without increasing the overall length of the lamp body.

Other aspects and advantages of the invention will be apparent from the following description and the appended claims.

DETAILED DESCRIPTION OF THE EXEMPLARY EMBODIMENTS

Embodiments of an infrared light irradiating lamp for a vehicle according to the invention will be described below in detail with reference to the accompanying drawings. Like items in the figures are shown with the same reference numbers.

In this application, a longitudinal direction of the vehicle is the direction in which a vehicle incorporating the infrared light irradiating lamp would travel, and front and forward denote a forward direction of travel of the vehicle, while behind and rear denote a backward direction of travel of the vehicle. A vertical direction is a direction perpendicular to a ground plane of the vehicle. A longitudinal direction of a filament is a direction in which the filament has the greatest length.

Figure 1:
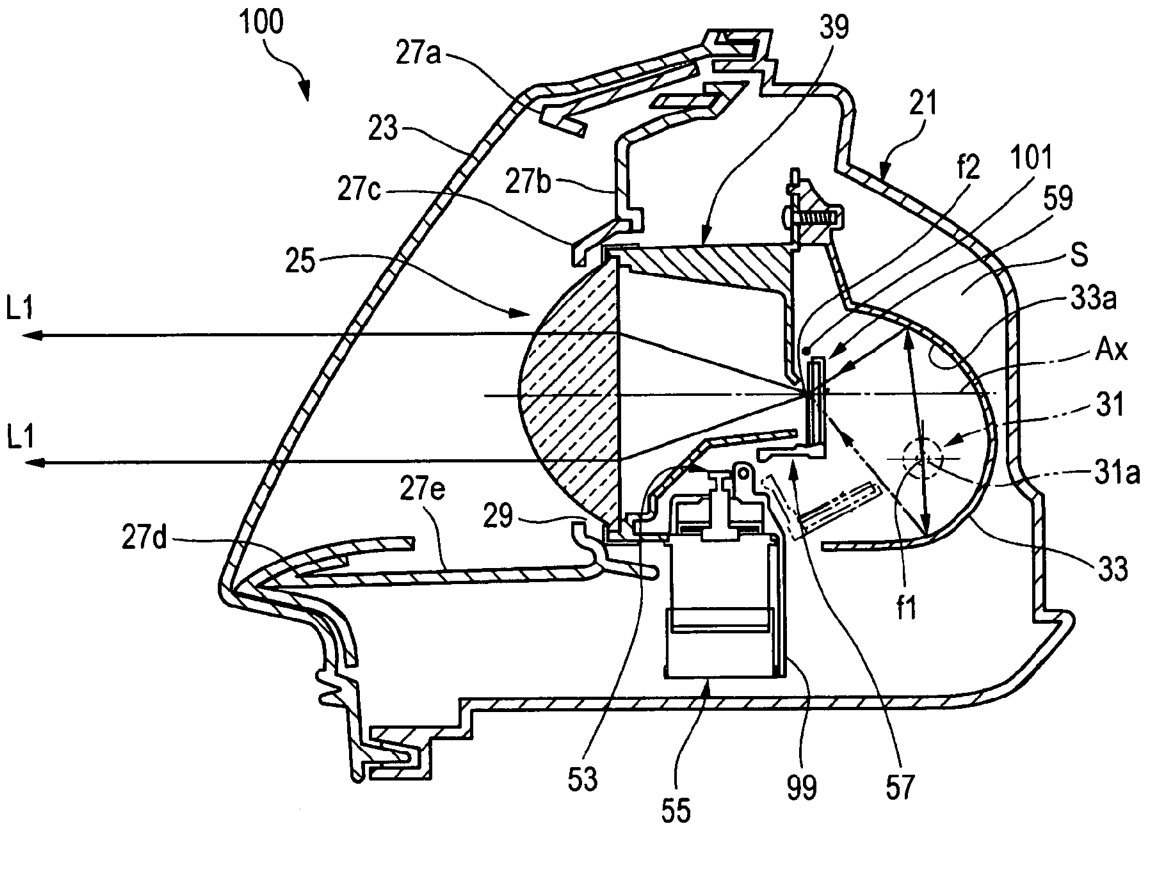
FIG. 1 is a vertical sectional view showing an infrared light irradiating lamp for a vehicle according to an embodiment of the invention.
Figure 2:
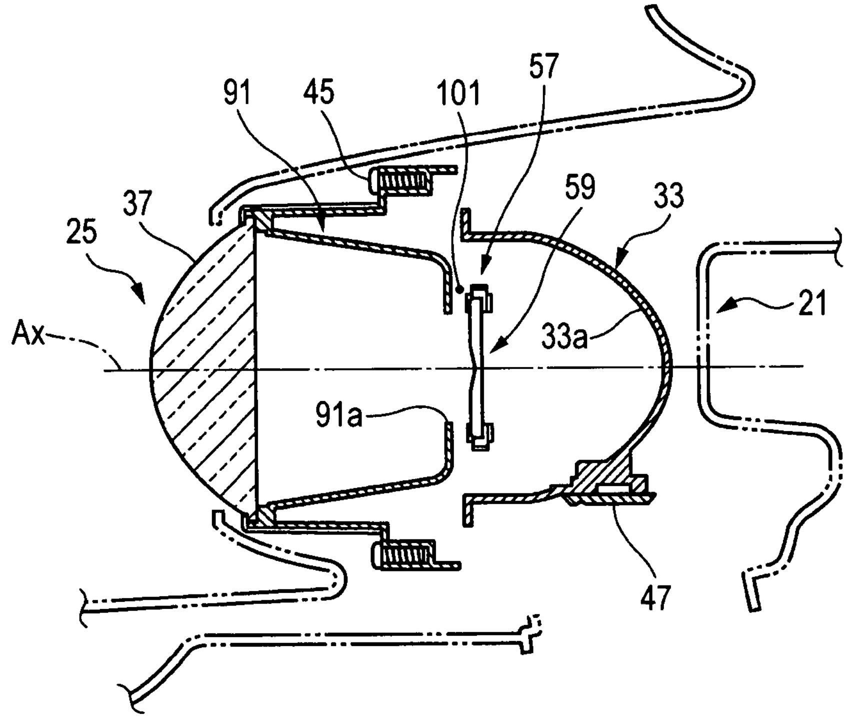
FIG. 2 is a horizontal sectional view showing a light source unit illustrated in FIG. 1.
Figure 3:
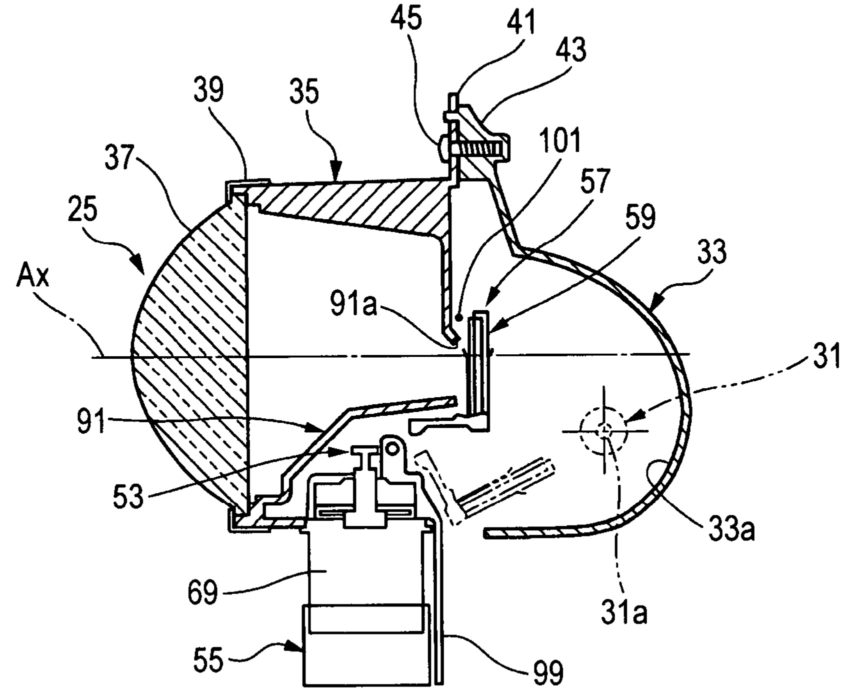
FIG. 3 is a vertical sectional view showing the light source unit illustrated in FIG. 1.
Figure 4:
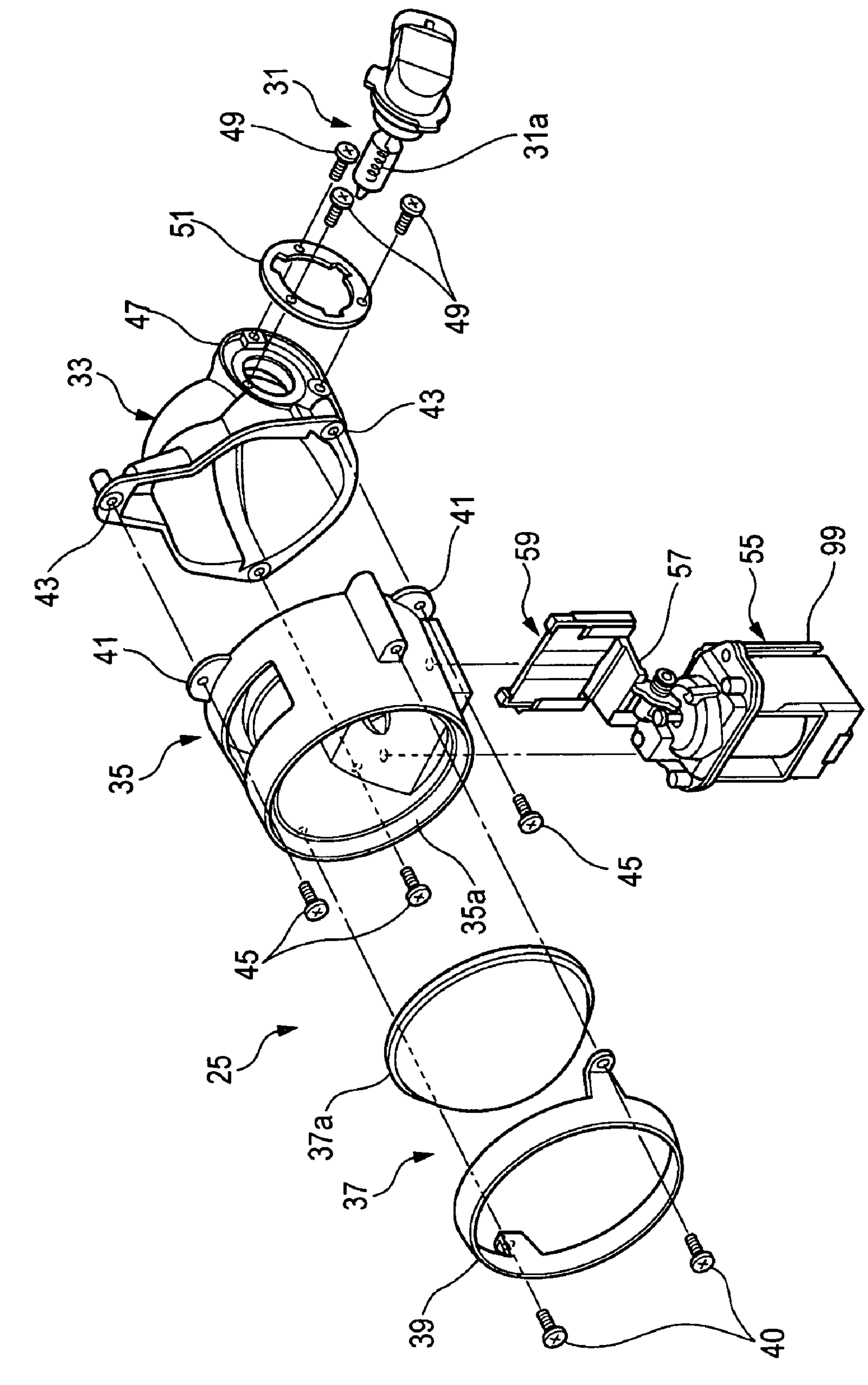
FIG. 4 is an exploded perspective view showing the light source unit illustrated in FIG. 1.

FIG. 1 is a vertical sectional view showing an infrared light irradiating lamp for a vehicle according to an embodiment of the invention. FIGS. 2 and 3 are horizontal and longitudinal sectional views showing a light source unit in FIG. 1. FIG. 4 is an exploded perspective view showing the light source unit in FIG. 1.

An infrared light irradiating lamp 100 for a vehicle according to the embodiment is used in a night forward visual field detecting system, for example, and is provided in a front portion of a vehicle to irradiate an infrared light onto a forward part of the vehicle. The night forward visual field detecting system is constituted by the infrared light irradiating lamp 100 for a vehicle shown in FIG. 1, an infrared light compatible CCD camera (not shown) which is provided in an upper part in a vehicle compartment and serves to photograph a view of field in the forward part of the vehicle, an image processing analyzing apparatus (not shown) for analyzing an image photographed by the CCD camera, and a head up display (HUD)

(not shown) for displaying data analyzed by the image processing analyzing apparatus, for example.

Images of invisible distant pedestrians, obstacles, or lane marks which are photographed by the CCD camera are sent to the image processing analyzing apparatus. By carrying out an edge processing or a pattern recognition from the images, it is possible to easily recognize the pedestrians, the obstacles, and the lane marks.

The images of the pedestrians, the obstacles, and the lane marks can be given to a driver through the head up display (HUD), and can decide the features of the objects on a road (the pedestrians, the obstacles, and the lane marks) through a shape recognition, thereby giving a notice to the driver in a voice.

As shown in FIG. 1, the infrared light irradiating lamp 100 for a vehicle is constituted by a lamp body 21 formed of a synthetic resin which has a front side opened and takes a shape of a vessel, a transparent front cover 23 assembled into the front opening portion of the lamp body 21 and serving to partition and form a lighting chamber S in cooperation with the lamp body 21, and a projection, type light source unit (light source unit) 25 accommodated in the lighting chamber S and supported to be regulated tiltably in vertical and transverse directions by means of an aiming mechanism which is not shown.

Extensions 27*a*, 27*b*, 27*c* and 27*e* constituted by a division into a plurality of portions are provided in the lamp body 21. The extensions 27*a*, 27*b*, 27*c* and 27*e* form an opening 29 for causing the light source unit 25 to appear and cover a portion of the light source unit 25 which does not need to be exposed.

As shown in FIGS. 2 and 3, the light source unit 25 has a reflector 33 formed by aluminum die casting into which a light source bulb 31 is inserted and attached, and a convex lens (a projection lens) 37 integrated with a forward part of the reflector 33 through a cylindrical lens holder 35 and disposed on an optical axis Ax extended in a longitudinal direction of the vehicle.

The reflector 33 has a reflector reflecting plane 33*a* taking an almost elliptical spherical shape and serving to reflect a light emitted from the light source bulb 31 close to the optical axis Ax, and has a first focal point f1 and a second focal point f2 between the reflector 33 and the projection lens 37.

The light source unit 25 has such a structure that a filament 31*a* of the light source bulb 31 is positioned on the first focal point f1 of the reflector 33 and the second focal point f2 of the reflector 33 is positioned in the vicinity of a rear focal point of the convex lens 37 so that a light of the light source which is reflected by an effective reflecting plane subjected to an aluminum evaporation treatment in the reflector 33 is changed into an almost parallel light L1 through the convex lens 37 and is thus projected and distributed.

More specifically, a light distribution pattern created by the light source unit 25 is the same as that of a headlamp of a car for forming a main beam.

As shown in FIG. 4, the lens holder 35 is formed by the same aluminum die casting as the reflector 33, and a front edge portion thereof is circumferentially provided with a lens engaging portion 35*a* taking a shape of a peripheral groove with which a peripheral flange portion 37*a* of the convex lens 37 can be engaged.

A lens holding frame 39 formed of a metal and taking a shape of a circular ring is fixed to the front edge portion of the lens holder 35 with a screw 40, and the peripheral flange portion 37*a* of the convex lens 37 is fixed and held in an engaging state with the lens engaging portion 35*a*.

A coupling flange portion 41 of the lens holder 35 and a coupling flange portion 43 of the reflector 33 are bonded to each other by bonding means such as a screw 45.

The light source bulb 31 of the light source unit 25 is inserted and fixed into an attaching opening portion 47 of the reflector 33 from the side of the optical axis Ax as shown in FIG. 4. More specifically, while the conventional infrared light irradiating lamp for a vehicle shown in FIG. 8 has a rear inserting structure, the infrared light irradiating lamp 100 for a vehicle according to the embodiment has a transverse inserting structure.

In the light source unit 25, consequently, the longitudinal direction of the filament 31*a* is almost orthogonal to the direction of the optical axis Ax and the filament 31*a* is disposed to be positioned on the first focal point f1. A removing ring 51 is fixed to the attaching opening portion 47 through a screw 49, and the removing ring 51 removably inserts and attaches the light source bulb 31 in a drip proof structure.

In the infrared light irradiating lamp 100 for a vehicle, as shown in FIG. 3, the light source bulb 31 is inserted and fixed into the reflector 33 from the side of the optical axis Ax in a position placed apart from the optical axis Ax in a vertical direction (a position placed apart in a downward direction in the embodiment).

Figure 8:
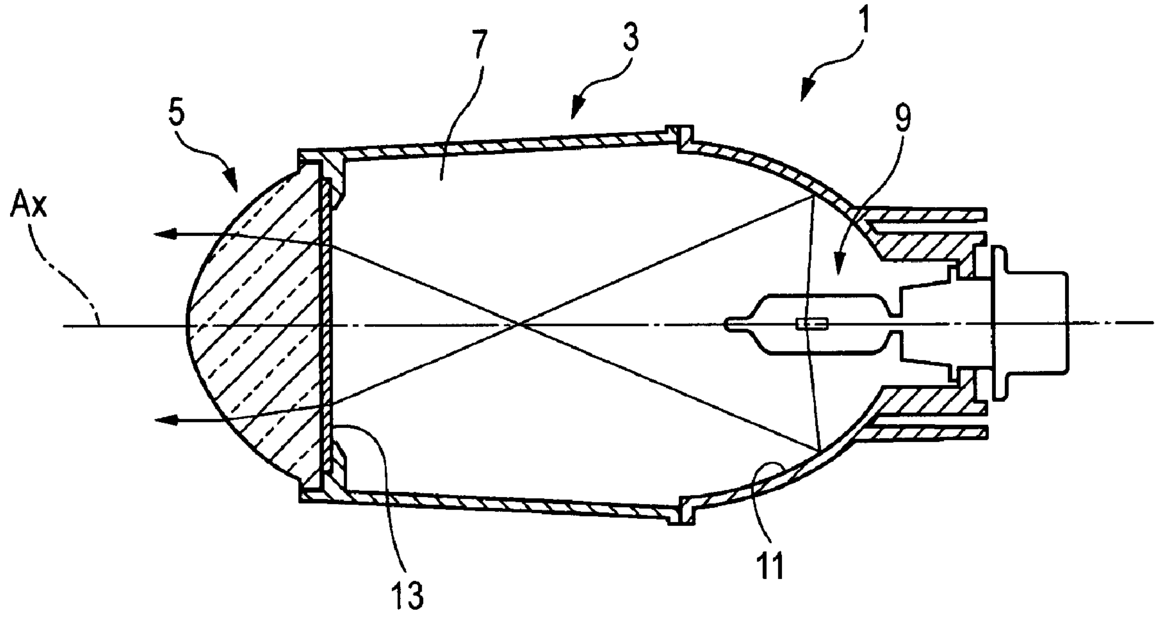
FIG. 8 is a vertical sectional view showing a conventional infrared light irradiating lamp for a vehicle.
Figure 9:
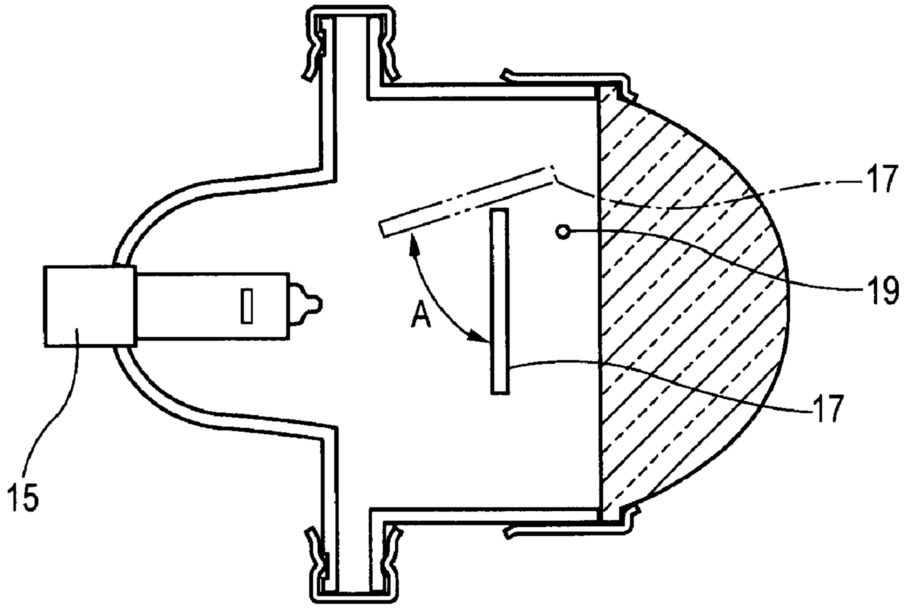
FIG. 9 is a vertical sectional view showing an infrared light irradiating lamp for a vehicle which comprises a conventional movable infrared light transmitting filter.

For example, in the conventional structure in which the light source bulb 9 is disposed on the optical axis as shown in FIG. 8, if the reflector reflecting plane functions in a state in which a vertical division into two parts is carried out and a shade is provided on a lower side, a light reflected by the reflecting plane in a lower half part is cut and wasted. An effective reflecting plane is only an upper reflecting plane having a small area which is divided into two parts so that a light utilization efficiency is reduced.

On the other hand, when the light source bulb 31 is inserted apart into the lower side of the optical axis Ax as in the embodiment, it is possible to maintain the larger reflector reflecting plane 33*a* which is continuous from a lower side of the optical axis Ax to an upper side thereof as compared with the case in which the reflector reflecting plane is vertically divided into two parts and is thus used. Consequently, it is possible to prevent the light reflected by the reflecting plane on the lower side from being wasted when the shade or a member such as a filter driving unit 55 which will be described below is present on the lower side of the optical axis Ax, for example. Thus, it is possible to increase the utilization efficiency of the light. In other words, it is possible to maintain an effective continuous reflecting plane to be large.

Figure 5:
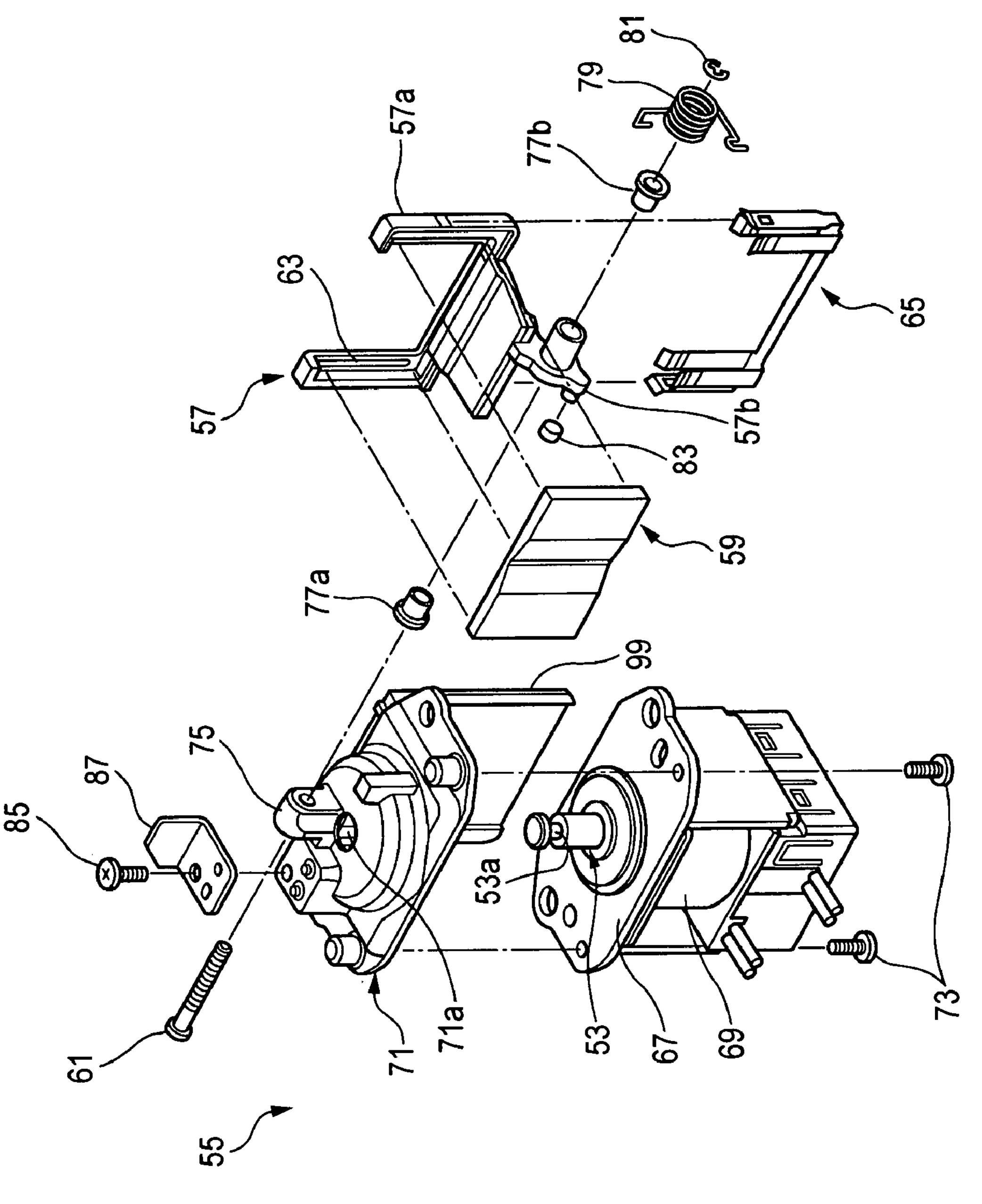
FIG. 5 is an exploded perspective view showing a filter driving unit illustrated in FIG. 4, FIG. 6(*a*) is a view for explaining an operation in an excitation state and FIG. 6(*b*) is a view for explaining an operation in a non-excitation state of a magnet coil of the filter driving unit illustrated in FIG. 4, FIG. 7(*a*) is a sectional view illustrating a state brought before a deformation of a rubber washer, FIG. 7(*b*) is a view illustrating a state brought after the deformation, and FIG. 7(*c*) is a top view of the washer.
Figure 6:
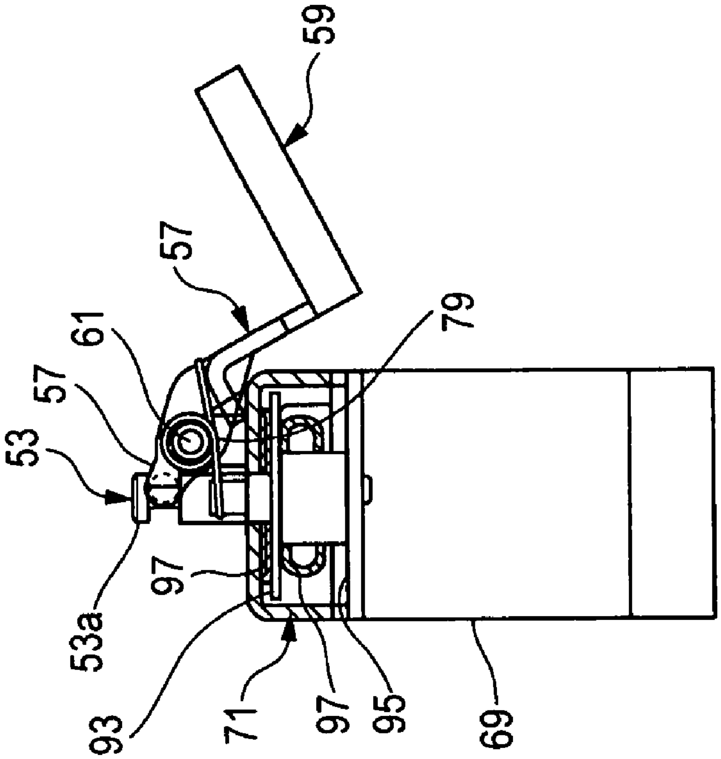
Figure 6:
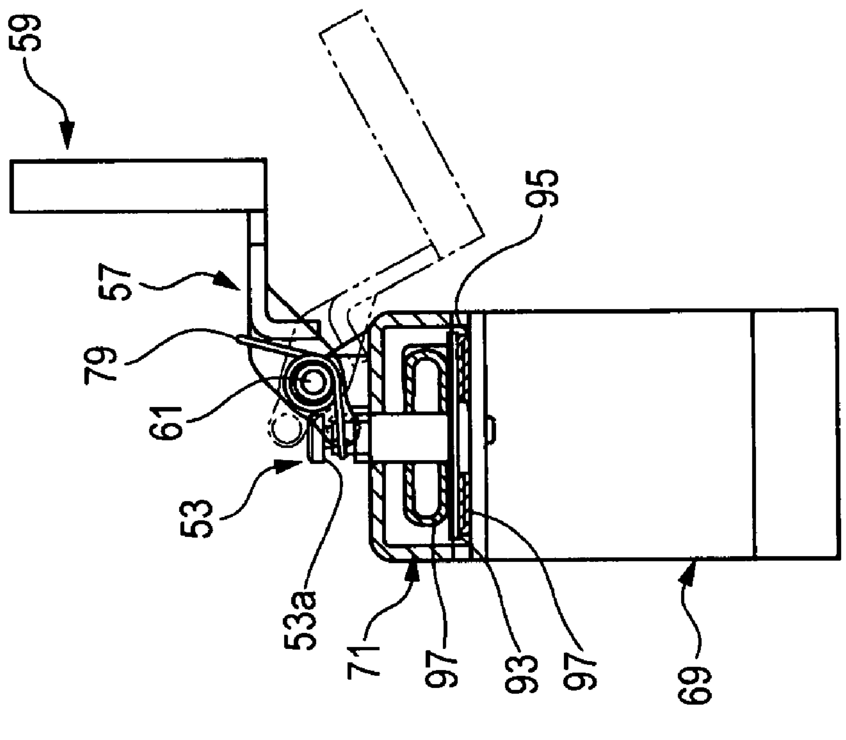

FIG. 5 is an exploded perspective view showing the filter driving unit illustrated in FIG. 4. FIG. 6(*a*) is a view for explaining an operation illustrating an excitation state and FIG. 6(*b*) is a view for explaining an operation illustrating a non-excitation state of a magnet coil in the filter driving unit in FIG. 4.

The filter driving unit 55 having a movable shaft 53 to be driven in an axial direction which is extended vertically and a bracket 57 are provided between the convex lens 37 and the light source bulb 31.

The bracket 57 is formed in such a manner that an infrared light transmitting filter 59 is held on a tip portion 57*a*, the movable shaft 53 is linked to a base end 57*b* on an opposite side of the tip portion 57*a* with a rotating shaft 61 interposed therebetween and a distance from the rotating shaft 61 to the base end 57*b* is shorter than a distance from the rotating shaft 61 to the tip portion 57*a*.

Furthermore, the bracket 57 includes a frame-shaped holder portion 63 for accommodating the infrared light transmitting filter 59, and a clip 65 for interposing the infrared light transmitting filter 59 engaged and accommodated in the holder portion 63 between a surface and a back face so as not to slip from the holder portion 63.

When the infrared light transmitting filter 59 is put in the holder portion 63 and the clip 65 is engaged with the holder portion 63, therefore, the infrared light transmitting filter 59 is held in the clip 65 simultaneously with the engagement of the clip 65 with the holder portion 63. With a simple structure and an easy attaching work, consequently, the infrared light transmitting filter 59 can be attached to the bracket 57 reliably and strongly.

The infrared light transmitting filter 59 is obtained by depositing, on a glass plate, an infrared light transmitting film for reflecting a visible light component and transmitting an infrared light component. In the light source unit 25 according to the embodiment, by disposing the infrared light transmitting film in the vicinity of the second focal point f2 of the reflector 33 in the proximity of a light collecting portion, it is possible to reduce a range in which the infrared light transmitting film is to be formed.

The movable shaft 53 is absorbed and driven by a magnetic force in a downward direction of FIG. 5 by an excitation of a magnet coil 69 accommodated in a yoke 67.

A base member 71 for inserting the movable shaft 53 is fixed to an upper part of the yoke 67 with a screw 73. A through hole 71*a* for protruding the movable shaft 53 therethrough is provided on the base member 71. A bearing portion 75 for causing the rotating shaft 61 to penetrate therethrough and supporting the rotating shaft 61 is erected in the vicinity of the through hole 71*a*.

A collar 77*a*, the base end 57*b*, a collar 77*b*, an outside spring 79 and an E ring 81 are sequentially provided on the tip of the rotating shaft 61 penetrating through the bearing portion 75. Consequently, the bracket 57 is supported to be rock able around the rotating shaft 61.

A cam bearing 83 is attached to the base end 57*b* of the bracket 57 and is slidably coupled (linked) to a step portion 53*a* of the movable shaft 53. The outside spring 79 energizes the bracket 57 in a clockwise direction of FIG. 6. When the magnet coil is OFF, that is, the magnet coil 69 is not excited, accordingly, the bracket 57 is rotated in a clockwise direction as shown in FIG. 6(*b*). Consequently, the base end 57*b* pushes up the step portion 53*a* so that the movable shaft 53 is disposed in an upward protruding position.

On the other hand, when the magnet coil is ON, that is, the magnet coil 69 is excited, the movable shaft 53 is moved downward by a magnetic force of the magnet coil 69 so that the cam bearing 83 is pushed downward by the step portion 53*a*. Consequently, the bracket 57 is rotated in a counterclockwise direction against the energizing force of the outside spring 79 as shown in FIG. 6(*b*). The bracket 57 rotated in the counterclockwise direction abuts on a spring plate 87 fixed onto an upper surface of the base member 71 with a screw 85 and is thus stopped.

In a filter driving unit 55 according to one or more embodiments, internal energizing means is not provided on the movable shaft 53 of the magnet coil 69, and the movable shaft 53 and the bracket 57 are energized and disposed in one direction by a clockwise moment of the bracket 57, which is generated by the outside spring 79.

Consequently, a clearance between members is put into one side and a looseness between the members is generated with difficulty by a small number of components. Corresponding to the fact that the energizing means is not built in, moreover, it is also possible to reduce a size and a weight of the magnet coil 69.

The infrared light transmitting filter 59 held in the bracket 57 can be displaced between a transmitting position in which a light reflected by the reflector 33 is intercepted and a retreating position in which the reflected light is not intercepted between the light source bulb 31 and the second focal point f2 by a vertical operation of the movable shaft 53.

If the bracket 57 is disposed in the position in which the light reflected by the reflector 33 is intercepted, the light emitted from the light source bulb 31 is transmitted through the infrared light transmitting filter 59 and can be used as an infrared light irradiating lamp. On the other hand, if the bracket 57 is disposed in the position in which the light reflected by the reflector 33 is not intercepted, the light emitted from the light source bulb 31 is directly irradiated as a visible light and can be used as a normal headlight.

In other words, according to the infrared light irradiating lamp 100 for a vehicle according to the embodiment, it is possible to cause one lamp to function as two different lamps, that is, an infrared light irradiating lamp and a normal headlight.

By transversely inserting the light source bulb 31, moreover, it is possible to maintain a larger space between the convex lens 37 and the light source bulb 31 as compared with the longitudinal insertion along the optical axis Ax. Therefore, it is possible to utilize the space as a movable space of the infrared light transmitting filter 59.

Moreover, the filter driving unit 55 having the movable shaft 53 to be driven in a vertical direction which is orthogonal to the optical axis Ax is provided between the light source bulb 31 and the convex lens 37, and furthermore, the movable shaft 53 rotates the infrared light transmitting filter 59 through the bracket 57. Therefore, the filter driving unit 55 can greatly move the infrared light transmitting filter 59 in a small joining portion housing space by utilizing the principles of a lever and can displace the infrared light transmitting filter 59 between the transmitting position and the retreating position.

Furthermore, the light source unit 25 according to the embodiment includes a shade 91 provided with an opening portion 91*a* for causing a part of the light reflected by the reflector 33 to pass therethrough as shown in FIGS. 2 and 3.

The infrared light transmitting filter 59 is displaced in order to intercept the reflected light passing through the opening portion 91*a* between the shade 91 and the light source bulb 31.

More specifically, the infrared light transmitting filter 59 is displaced on the light source bulb 31 side of the shade 91. Therefore, the infrared light transmitting filter 59 and the vicinal members are covered with the shade 91, and the external appearances of the infrared light transmitting filter 69, the filter driving unit 55 and the bracket 57 cannot be seen from the outside of the lamp (the outside of the convex lens 37). Consequently, the appearance can be enhanced.

As shown in FIG. 6(*a*), the filter driving unit 55 has a plate 93 fixed coaxially with the movable shaft 53 and absorbed by a magnetic force through an excitation of the magnet coil 69, and an abutting surface 95 of the yoke 67 on which the plate 93 pulled by the magnetic force abuts.

A hollow rubber washer 97 is provided coaxially with the movable shaft 53 between the plate 93 and the abutting surface 95.

Figure 7:
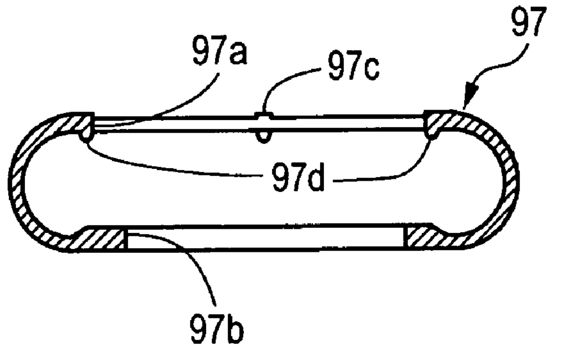
Figure 7:
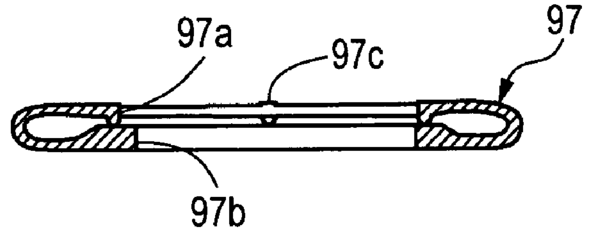
Figure 7:
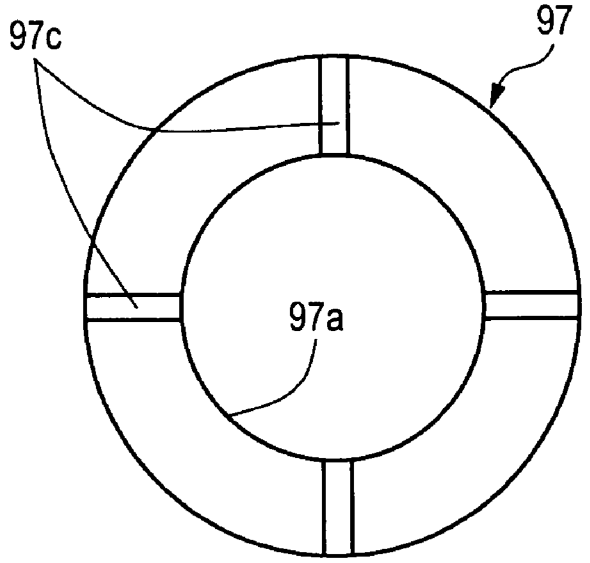

FIG. 7(*a*) is sectional views illustrating a state brought before a deformation of the rubber washer, FIG. 7(*b*) a state brought after the deformation, and FIG. 7(*c*) is a top view of the rubber washer.

The rubber washer 97 has a pair of holes 97*a* and 97*b* in a central part and is formed to take a doughnut shape having an almost U-shaped section. Moreover, a plurality of (four in the embodiment) ribs 97*c* is extended in a radial direction over an upper surface of the rubber washer 97. Furthermore, a plurality of (four in the embodiment) projections 97*d* is provided at an equal interval along an opening edge of the hole 97*a* on an inner side of the opening edge.

When the magnet coil 69 is excited and the movable shaft 53 is moved in an axial direction so that the plate 93 tries to collide with the abutting surface 95, therefore, the rubber washer 97 is interposed between the plate 93 and the abutting surface 95 as shown in FIG. 6(*a*) and is broken as shown in FIG. 7(*b*). By the deformation of the rubber washer 97, colliding energy of the plate 93 in an ON operation of the magnet coil is absorbed so that a colliding sound, a vibration, and heat, which are generated by the collision, are relieved. When the rubber washer 97 is broken, furthermore, air in the rubber washer 97 is not released instantaneously and the rubber washer 97 is broken in a state in which the air is stored. Therefore, the colliding sound, the vibration, and the heat, which are generated by the collision, can be relieved more greatly.

When the excitation state of the magnet coil 69 is set continuously, the air is gradually released and gone from a gap maintained between the upper surface of the rubber washer 97 and the plate 93 through the rib 97*c* provided on the upper surface and a repulsive force of the rubber washer 97 is decreased so that a load of the magnet coil 69 is decreased. When the rubber washer 97 is broken as shown in FIG. 7(*b*), moreover, the projection 97*d* abuts on an internal surface opposed thereto so that the internal surfaces can be prevented from sticking together.

Moreover, the hollow rubber washer 97 is also provided coaxially with the movable shaft 53 between the base member 71 and the plate 93. When the magnetic force of the magnet coil 69 is dissipated, the movable shaft 53 is moved in an axial direction and the plate 93 tries to collide with the base member 71 as shown in FIG. 6(*b*), the rubber washer 97 is interposed between the plate 93 and the base member 71 and is thus broken. By the deformation of the rubber washer 97, colliding energy of the plate 93 in an OFF operation of the magnet coil is absorbed so that the colliding sound, the vibration, and the heat, which are generated by the collision, are relieved.

Furthermore, a movable space between the abutting surface 95 and the plate 93 is covered with the base member 71. Consequently, a sound is insulated from the movable space, the magnet coil 69 is turned ON/OFF and the movable shaft 53 is moved in the axial direction so that it is possible to relieve a leakage of the colliding sound generated when the plate 93 collides with the abutting surface 95 or the base member 71. Moreover, the base member 71 for supporting the rotating shaft 61 serves as a sound insulating member. Therefore, the number of components can be prevented from being increased.

In addition, a solenoid protecting plate 99 for intercepting a direct light emitted from the light source bulb 31 and the light reflected by the reflector 33 is formed integrally with the base member 71 as shown in FIG. 5. Therefore, the light which is emitted from the light source bulb 31 and is reflected by the reflector 33 is intercepted by the solenoid protecting plate 99 and is not irradiated on the magnet coil 69 of the filter driving unit 55.

More specifically, the filter driving unit 55 is to be disposed close to an opening on the front surface of the reflector 33. When a temperature is excessively raised by a radiation from an outside in addition to the generation of heat of the magnet coil 69 itself, however, an insulating coat of a conductor is deteriorated so that an operational reliability is reduced.

Therefore, it is possible to maintain the operational reliability of the magnet coil 69 with a simple structure without increasing the number of components by the solenoid protecting plate 99 provided integrally with the base member 71.

As shown in FIGS. 2 and 3, a clearance 101 for introducing a part of the light reflected by the reflector 33 and irregularly reflecting the reflected light by a rear face of the shade 91, reflecting the reflected light by a front surface of the infrared light transmitting filter 59 or that of the bracket 57 and irradiating the reflected on the convex lens 37 is formed between the shade 91 and the bracket 57.

Therefore, the infrared light transmitting filter 59 is disposed in the opening portion 91*a* of the shade 91 so that the light emitted from the light source bulb 31 is transmitted through the infrared light transmitting filter 59 and is emitted as a reddish infrared light. By mixing, into the infrared light, a white light which is emitted from the light source bulb 31 and is not transmitted through the infrared light transmitting filter 59 but the clearance 101, however, it is possible to reduce the convex lens 37 which becomes reddish and is visually observed in the irradiation of an infrared light.

More specifically, according to the infrared light irradiating lamp 100 for a vehicle according to the embodiment, it is possible to maintain a larger space between the second focal point f2 and the light source bulb 31 as compared with the longitudinal insertion along the optical axis Ax by transversely inserting the light source bulb 31 in such a manner that the longitudinal direction of the filament 31*a* is almost orthogonal to the direction of the optical axis Ax. Therefore, it is possible to utilize the space as a movable space of the infrared light transmitting filter 59.

Moreover, the filter driving unit 55 having the movable shaft 53 to be vertically driven is provided between the light source bulb 31 and the convex lens 37, and furthermore, the movable shaft 53 rotates the infrared light transmitting filter 59 through the bracket 57. Therefore, the filter driving unit 55 can greatly move the infrared light transmitting filter 59 in a small joining portion housing space by using the principles of a lever, thereby displacing the infrared light transmitting filter 59 between the transmitting position and the retreating position.

As compared with the conventional infrared light irradiating lamp, accordingly, it is possible to dispose the infrared light transmitting filter 59 more greatly apart from the convex lens in a rearward direction and to prevent a glare without increasing the overall length of the lamp body.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF THE REFERENCE NUMERALS AND SIGNS

31 . . . light source bulb
31*a* . . . filament
33 . . . reflector
33*a* . . . reflector reflecting plane
37 . . . convex lens (projection lens)
53 . . . movable shaft
55 . . . filter driving unit
57 . . . bracket
57*a* . . . tip portion
57*b* . . . base end

59 . . . infrared light transmitting filter
61 . . . rotating shaft
91 . . . shade
91*a* . . . opening portion
97 . . . rubber washer
100 . . . infrared light irradiating lamp for vehicle
101 . . . clearance
Ax . . . optical axis
f1 . . . first focal point
f2 . . . second focal point

What is claimed is:

1. An infrared light irradiating lamp for a vehicle comprising:

a projection lens disposed on an optical axis extending in a longitudinal direction of the vehicle;

a light source bulb disposed behind a rear focal point of the projection lens such that a longitudinal direction of a filament is substantially orthogonal to the optical axis;

a reflector for reflecting light emitted from the light source bulb in a forward direction close to the optical axis by setting the light source bulb as a first focal point of the reflector;

a filter driving unit disposed between the projection lens and the light source bulb, the filter driving unit comprising a movable shaft to be driven in a vertical direction;

a bracket comprising a tip portion and a base end, wherein the tip portions holds an infrared light transmitting filter and a rotating shaft linking the movable shaft to the base end of the bracket, wherein a distance from the rotating shaft to the base end is less than a distance from the rotating shaft to the tip portion, wherein the infrared light transmitting filter is movable between a transmitting position in which light reflected by the reflector is intercepted and a retreating position in which the reflected light is not intercepted between the light source bulb and a second focal point of the reflector, further comprising a shade provided with an opening portion for causing a part of the light reflected by the reflector to pass therethrough, wherein the infrared light transmitting filter is movable between the shade and the light source bulb in order to intercept the reflected light passing through the opening portion, wherein a clearance for introducing a part of the light reflected by the reflector and direct light emitted from the light source bulb is formed between the shade and the bracket, wherein the shade, the infrared light transmitting filter, and the bracket are positioned such that the light introduced through the clearance is reflected by the shade, reflected by at least one of the infrared light transmitting filter and the bracket, and irradiated on the projection lens.

2. The infrared light irradiating lamp for a vehicle according to claim 1, wherein the bracket is rotatable about the rotating shaft between the transmitting position and the retreating position.

3. The infrared light irradiating lamp for a vehicle according to claim 1, wherein the bracket is moved to the transmitting position by a magnetic force on the movable shaft, and is moved to the retreating position by a spring.

4. The infrared light irradiating lamp for a vehicle according to claim 3, further comprising a rubber washer for absorbing colliding energy when the magnetic force is turned on.

5. The infrared light irradiating lamp for a vehicle according to claim 1, wherein the filter driving unit comprises magnet coils for driving the movable shaft.

6. The infrared light irradiating lamp for a vehicle according to claim 1, wherein the base end of the bracket comprises a flat section and an extended section, the extended section operable to accommodate the rotating shaft.

7. The infrared light irradiating lamp for a vehicle according to claim 1, wherein the bracket comprises a frame-shaped holder portion for accommodating the infrared light transmitting filter, and a clip for securing the infrared light transmitting filter in the holder portion.

* * * * *